US006992645B2

(12) United States Patent
Kim et al.

(10) Patent No.: US 6,992,645 B2
(45) Date of Patent: Jan. 31, 2006

(54) METHOD AND APPARATUS FOR DRIVING PLASMA DISPLAY PANEL

(75) Inventors: Joong Kyun Kim, Seoul (KR); Jae Hwa Ryu, Kumi-shi (KR)

(73) Assignee: LG Electronics Inc., Seoul (KR)

( * ) Notice: Subject to any disclaimer, the term of this patent is extended or adjusted under 35 U.S.C. 154(b) by 305 days.

(21) Appl. No.: 10/305,097

(22) Filed: Nov. 27, 2002

(65) Prior Publication Data

US 2003/0098825 A1 May 29, 2003

(30) Foreign Application Priority Data

Nov. 29, 2001 (KR) ...................... 10-2001-0074847

(51) Int. Cl.
*H04N 13/00* (2006.01)

(52) U.S. Cl. ............................ 345/66; 345/60; 345/62; 345/63; 345/68; 345/73; 313/484; 313/485; 313/582; 313/584; 313/585; 315/169.4; 348/201

(58) Field of Classification Search .................. 345/60, 345/62, 63, 66, 68, 73; 313/484, 485, 582, 313/584, 585; 315/169.4; 348/201
See application file for complete search history.

(56) References Cited

U.S. PATENT DOCUMENTS

| | | | | |
|---|---|---|---|---|
| 5,797,632 | A * | 8/1998 | Rice | 283/114 |
| 5,801,794 | A * | 9/1998 | Lehureau et al. | 349/5 |
| 6,025,882 | A * | 2/2000 | Geshwind | 375/240.26 |
| 6,064,424 | A * | 5/2000 | van Berkel et al. | 348/51 |
| 6,088,012 | A * | 7/2000 | Shigeta et al. | 345/63 |
| 6,091,396 | A * | 7/2000 | Minami et al. | 345/690 |
| 6,097,357 | A * | 8/2000 | Shinoda et al. | 345/63 |
| 6,281,628 | B1 * | 8/2001 | Choi et al. | 313/585 |
| 2001/0008363 | A1 * | 7/2001 | Sanghera et al. | 313/496 |
| 2001/0026129 | A1 * | 10/2001 | Ahn et al. | 313/586 |
| 2001/0026269 | A1 * | 10/2001 | Sano | 345/204 |
| 2002/0024303 | A1 * | 2/2002 | Sano et al. | 313/582 |
| 2002/0097237 | A1 * | 7/2002 | Tomio et al. | 345/211 |
| 2002/0126074 | A1 * | 9/2002 | Ouellette et al. | 345/87 |

* cited by examiner

*Primary Examiner*—Ricardo Osorio
*Assistant Examiner*—Vincent E. Kovalick
(74) *Attorney, Agent, or Firm*—Fleshner & Kim LLP.

(57) ABSTRACT

It is disclosed that there is a method and an apparatus for driving a plasma display panel that is adaptive for improving brightness as well as realizing a high resolution.

A method and an apparatus for driving a plasma display panel according to the present invention displays discharge cells of the $(3i-2)^{th}$ and $(3i-1)^{th}$ rows in use of the first video signal field; and discharge cells of the $(3i-1)^{th}$ and $(3i)^{th}$ rows in use of the second video signal field.

20 Claims, 12 Drawing Sheets

METHOD AND APPARATUS FOR DRIVING PLASMA DISPLAY PANEL

BACKGROUND OF THE INVENTION

1. Field of the Invention

This invention relates to a plasma display panel, and more particularly to a method and an apparatus for driving a plasma display panel that is adaptive for improving brightness as well as realizing a high resolution.

2. Description of the Related Art

Generally, a plasma display panel (PDP) radiates a phosphorus by an ultraviolet generated during a discharge of He+Xe, Ne+Xe or He+Ne+Xe gas to thereby display a picture including characters and graphics. Such a PDP is easy to be made into a thin-film and large-dimension type. Moreover, the PDP provides a very improved picture quality owing to a recent technical development. Particularly, a three-electrode, alternating current (AC) surface-discharge type PDP has advantages of a low-voltage driving and a long life because it can lower a voltage required for a discharge using wall charges accumulated on the surface thereof during the discharge and protect the electrodes from a sputtering caused by the discharge. Further, since the PDP does not need to form an active switching device for each cell like a liquid crystal display LCD, its fabricating process is simple, it is advantageous to be made into a big screen and its response speed is fast.

Referring to FIG. 1, a discharge cell of a three electrode AC discharge PDP includes a scanning electrode 30Y and a sustaining electrode 30Z formed on an upper substrate 10, and an address electrode 20X formed on a lower substrate 18.

The scanning electrode 30Y and the sustaining electrode 30Z include transparent electrodes 12Y and 12Z and metal bus electrodes 13Y and 13Z formed on one side edge of the transparent electrode with their line width narrower than that of the transparent electrode 12Y and 12Z. The transparent electrodes 12Y and 12Z are generally formed from Indium-Tin-Oxide ITO on the upper substrate 10. Chromium Cr/Copper Cu/Chromium Cr are deposited by a deposition method, and then an Etching process is carried out to form the metal bus electrode, or that is formed by printing photosensitive Silver Ag paste, then patterning it, and then firing it. There are an upper dielectric layer 14 and a passivation film 16 deposited on the upper substrate 10 provided with the scanning electrode 30Y and the sustaining electrode 30Z. In the upper dielectric layer 14, wall charges generated upon a plasma discharge are accumulated. The passivation film 16 protects the upper dielectric layer 14 from a sputtering caused upon the plasma discharge and increase an emission efficiency of secondary electrons. Normally, the passivation film 16 is made from Magnesium Oxide MgO. The address electrode 20X are formed in a direction of intersecting the scanning electrode 30Y and the sustaining electrode 30Z. There are a lower dielectric layer 22 and barrier ribs 24 formed on a lower substrate 18 provided with the address electrode 20X. There is a phosphorus layer 26 formed on the surface of the barrier ribs and the lower dielectric layer 22. The barrier ribs are formed in parallel to the address electrode 20X to divide discharge cells physically and to prevent UV ray and visible ray generated by the discharge from leaking to adjacent discharge cells The phosphorus layer 26 is excited by the UV ray generated upon the plasma discharge and radiates to generate any one visible ray among red, green and blue. There is inactive mixture gas such as He+Xe, Ne+Xe or He+Ne+Xe for the discharge interposed in a discharge space of the discharge cell provided between the upper/lower substrates 10 and 18 and the barrier ribs 24.

The arrangement of the electrodes of the PDP is shown as in FIG. 2. As can be seen in FIG. 2, the scanning electrode Y1 to Yn and the sustaining electrode line Z are parallel and form a pair in one discharge cell. The address electrode line X1 to Xm intersects a pair of sustaining electrode lines Y1 to Yn, Z. Accordingly, one pair of sustaining electrode lines Y1 to Yn, Z and one address electrode line X1 to Xm cross each other in one discharge cell. One pixel 200 is arranged side by side in a horizontal direction and includes three discharge cells 100, which displays red, green and blue respectively.

Such a PDP divides a time period of one field of a video signal into several sub-fields SF1 to SF8, which have their emission frequency different from one another, to display a video. Each sub-field is divided again into a reset period for generating a discharge uniformly, an address period A1 to A8 for selecting discharge cells and a sustaining period S1 to S8 for realizing gray level in accordance with a discharge frequency. The reset period and the address period of each sub-field are the same every sub-field, whereas a sustaining period and the discharge frequency thereof increase proportional to $2^n$ (provided n=0,1,2,3,4,5,6,7) in each sub-field. Like this, since the sustaining periods are different in each sub-field, it is possible to realize a gray level of video.

In order to increase a display quality of the PDP, PDP manufacturers have actively been studying on a discharge cell structure and a new driving method for realizing a high resolution and a high speed driving.

FIG. 4 briefly illustrates a conventional PDD which is scanned in a interlaced scanning;

Referring to FIG. 4, in the conventional PDP scanned in the interlaced scanning, the scanning electrode lines Y1, Y2 and Y3 and the sustaining electrode lines Z1, Z2 and Z3 are shared by two discharge cells perpendicularly adjacent thereto, and odd horizontal display lines HLodd1, HLodd2 and HLodd3 are separately displayed from even horizontal display lines HLeven1, HLeven2 and Hleven3.

Further, the PDP, as in FIG. 4, includes the barrier ribs 24 of a stripe shape. Since the PDP has the barrier ribs formed in parallel, it is advantageous that fabrication is easy and space charges freely move between discharge cells. However, since there is no barrier rib between perpendicularly adjacent discharge cells, there is a problem of cross talk being generated between the discharge cells.

In order to solve the problem caused in the PDP structure of FIG. 4, a PDP proposed in Japanese Laid-open Patent Gazette No. 2001-176396, as in FIG. 5, has extended parts and narrow parts repeated perpendicularly and includes barrier ribs 54 formed in a lattice shape.

In the PDP as in FIG. 5, scanning electrode lines Y1 to Y5 and sustaining electrode lines Z1 to Z4 are shared by discharge cells adjacent perpendicularly. Also, in the PDP driving method as in FIG. 5 according to U.S. Pat. No. 6,281,628, one pixel P includes three sub-pixels of red, green and blue together with two scanning electrode lines Y1 and Y2, one sustaining electrode line Z1 and three address electrode lines X3, X4 and X5, and each of sub-pixels of the pixel P is selected by an address discharge and displays a picture by a sustaining discharge.

A PDP shown in FIG. 6 has barrier ribs 64 formed in a lattice shape similarly to that in FIG. 5, but there is a difference in the fact that each of discharge cells is separately composed of scanning electrode lines Y1 to Y8 and sustaining electrode line Z1 to z8 which are adjacent thereto perpendicularly. Accordingly, in the PDP of FIG. 6, one pixel P includes three sub-pixels of red, green and blue together with two scanning electrode lines Y1 and Y2, two sustaining electrode lines Z1 and Z2 and three address electrode lines X3, X4 and X5, and each of sub-pixels of the pixel P is selected by an address discharge and displays a picture by a sustaining discharge.

In the PDP of FIGS. 5 and 6, the pixel P is formed in a 'Δ' (delta) type. The PDP of such a delta type pixel structure, as can be seen in FIG. 7, has only four horizontal display lines carry out actual display among eight rows of discharge cells (i−4 to i+3). In other words, the pixels P arranged perpendicularly along the $(j-2)^{th}$ address electrode line are only four of P(i−3½, j−2), P(i−1½, j−2), P(i+1½, j−2) and P(i+2½, j−2) among eight rows of discharge cells (i−4 to i+3). Also, the pixels P arranged perpendicularly along the $(j+1)^{th}$ address electrode line are only four of P(i−3½, j+1), P(i−1½, j+1), P(i+1½, j+1) and P(i+2½, and P(i+2½, j+1) among eight rows of discharge cells (i−4 to i+3).

Accordingly, it is difficult to realize a PDP with high resolution and high definition in the PDP of the conventional delta type pixel structure. For example, according to the conventional delta type pixel structure, in order to realize a high resolution PDP with 760 or more horizontal lines, because the number of the discharge cell rows to be needed is twice as many, i.e., 1520, or more, so that it is inevitable that an overall size thereof get big. In order to solve this problem, the area of each discharge cell can be reduced, however if the area of each discharge cell gets small, here comes another problem that its brightness decrease as much.

SUMMARY OF THE INVENTION

Accordingly, it is an object of the present invention to provide a method and an apparatus for driving a plasma display panel that is adaptive for improving brightness as well as realizing a high resolution.

In order to achieve these and other objects of the invention, a method of driving a plasma display panel according to an aspect of the present invention includes steps of dividing a video signal into a first video signal field and a second video signal field; displaying discharge cells of the $(3i-2)^{th}$ and $(3i-1)^{th}$ rows (provided i is natural number) of the plasma display panel by applying the first video signal field to the plasma display panel; and displaying discharge cells of the $(3i-1)^{th}$ and $(3i)^{th}$ rows of the plasma display panel by applying the second video signal field to the plasma display panel.

In the method, the rows of the discharge cells are differently selected in accordance with the video signal field.

A method of driving a plasma display panel according to another aspect of the present invention includes steps of dividing a video signal into a first video signal field and a second video signal field; displaying discharge cells of the $(2i-1)^{th}$ and $(2i)^{th}$ rows (provided i is natural number) of the plasma display panel by applying the first video signal field to the plasma display panel; and displaying discharge cells of the $(2i)^{th}$ and $(2i+1)^{th}$ rows of the plasma display panel by applying the second video signal field to the plasma display panel.

In the method, the rows of the discharge cells are differently selected in accordance with the video signal field.

A method of driving a plasma display panel with a pixel cell that includes sub-pixel cells each displaying red, green and blue according to still another aspect of the present invention includes steps of dividing a video signal into a first video signal field and a second video signal field; displaying a first pixel cell in use of the first video signal field; and displaying a second pixel cell, part of which overlaps with the first pixel cell, in use of the second video signal field.

In the method, the first pixel cell have the sub-pixel cells arranged in any one of a 'Δ' type and a '∇' type.

In the method, the second pixel cell have the sub-pixel cells arranged in any one of a 'Δ' type and a '∇' type.

In the method, two of the sub-pixel cells of the first pixel cell overlap with two of the sub-pixel cells of the second pixel cell.

In the method, the first and second pixel cells overlap with each other in space and are separated in time.

A driving apparatus of a plasma display panel with a pixel cell that includes sub-pixel cells each displaying red, green and blue according to still another aspect of the present invention includes a data aligner dividing a video signal into a first video signal field and a second video signal field; a first driver displaying a first pixel cell in use of the first video signal field; and a second driver displaying a second pixel cell, part of which overlaps with the first pixel cell, in use of the second video signal field.

The first pixel cell have the sub-pixel cells arranged in any one of a 'Δ' type and a '∇' type.

The second pixel cell have the sub-pixel cells arranged in any one of a 'Δ' type and a '∇' type.

Herein, the plasma display panel includes lattice type barrier ribs for dividing the sub-pixel cells; an address electrode alternately arranged in the barrier ribs and the sub-pixel cells in a vertical direction in a cycle of one discharge cell; a scanning electrode intersecting the address electrode; and a sustaining electrode intersecting the address electrode.

The scanning electrode and the sustaining electrode are shared by perpendicularly adjacent sub-pixel cells.

The scanning electrode and the sustaining electrode are independently arranged in each of perpendicularly adjacent sub-pixel cells.

Herein, the first driver includes a data driver for applying data of the first video signal field to the address electrode; and a scanning/sustaining driver for selecting a sub-pixel cell row of the first pixel cell and sustaining a discharge in each of the selected sub-pixel cells.

Herein, the second driver includes a data driver for applying data of the second video signal field to the address electrode; and a scanning/sustaining driver for selecting a sub-pixel cell row of the second pixel cell and sustaining a discharge in each of the selected sub-pixel cells.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figure 8:
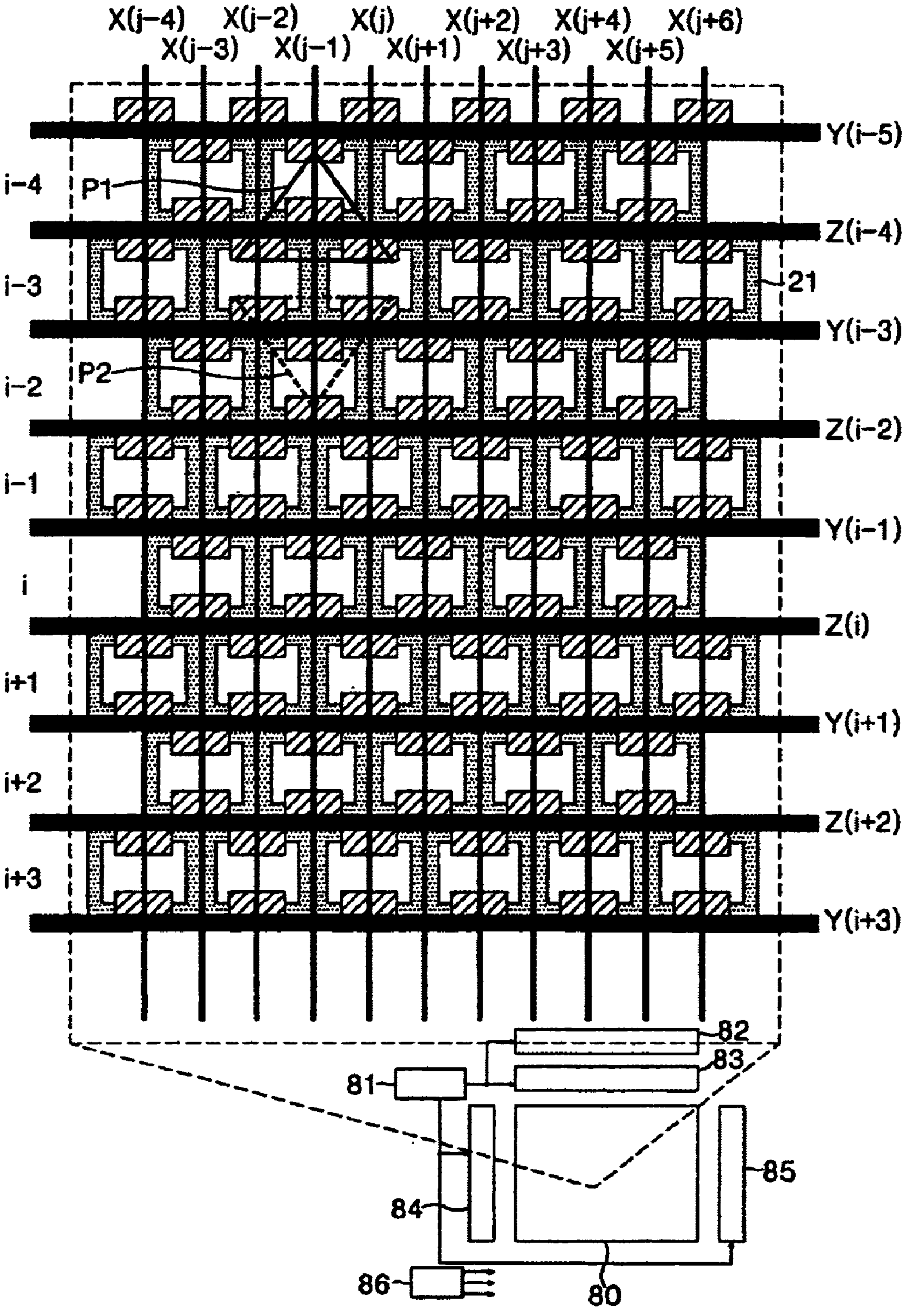
FIG. 8 illustrates a plane view of a PDP according to the present invention and a driving apparatus for the PDP.

Referring to FIG. 8, a driving apparatus of a PDP according to an embodiment of the present invention includes a PDP 80; a data aligner 82 dividing data RGB into a first video signal field and a second video signal field; an X driver 83 applying the data from the data aligner 82 to address electrode lines (X(j−4) to X(j+4)) of the PDP 80; a Y driver 84 driving scanning electrode lines (Y(i−5) to Y (i+3)) of the PDP 80; a Z driver 85 driving sustaining electrodes (Z(i−4) to Y(i+2)) of the PDP 80; a timing controller 81 controlling each of the electrode drivers 81 to 83; and a power supply circuit 86 generating driving voltages Vx, Yy and Zz.

Figure 1:
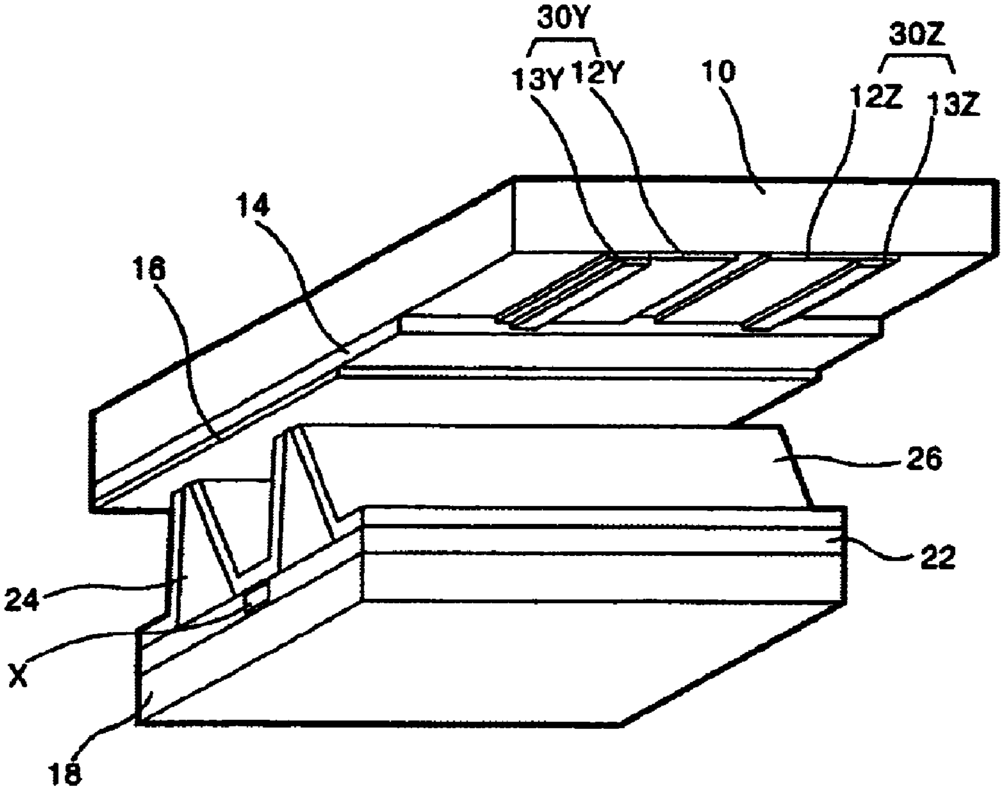
FIG. 1 RELATED ART
FIG. 1 illustrates a perspective view of a conventional three-electrode AC surface discharge PDP.
Figure 2:
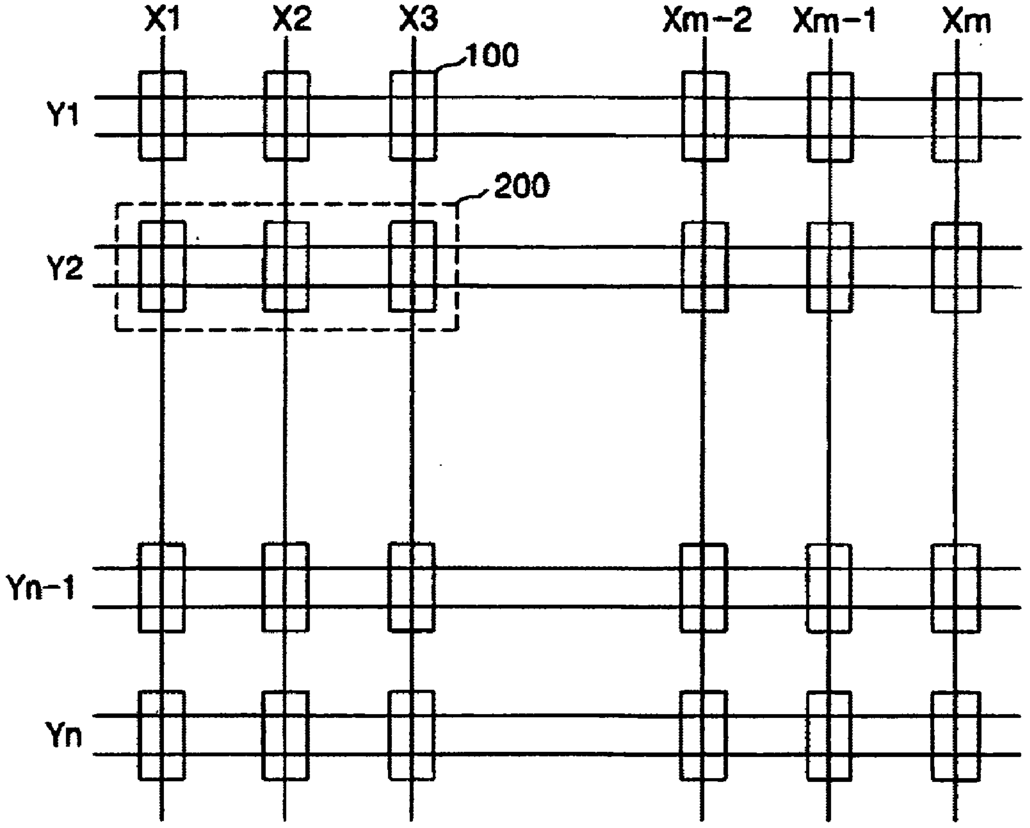
FIG.2 RELATED ART
FIG. 2 illustrates a plane view of an electrode arrangement of a PDP shown in FIG. 1.
Figure 3:
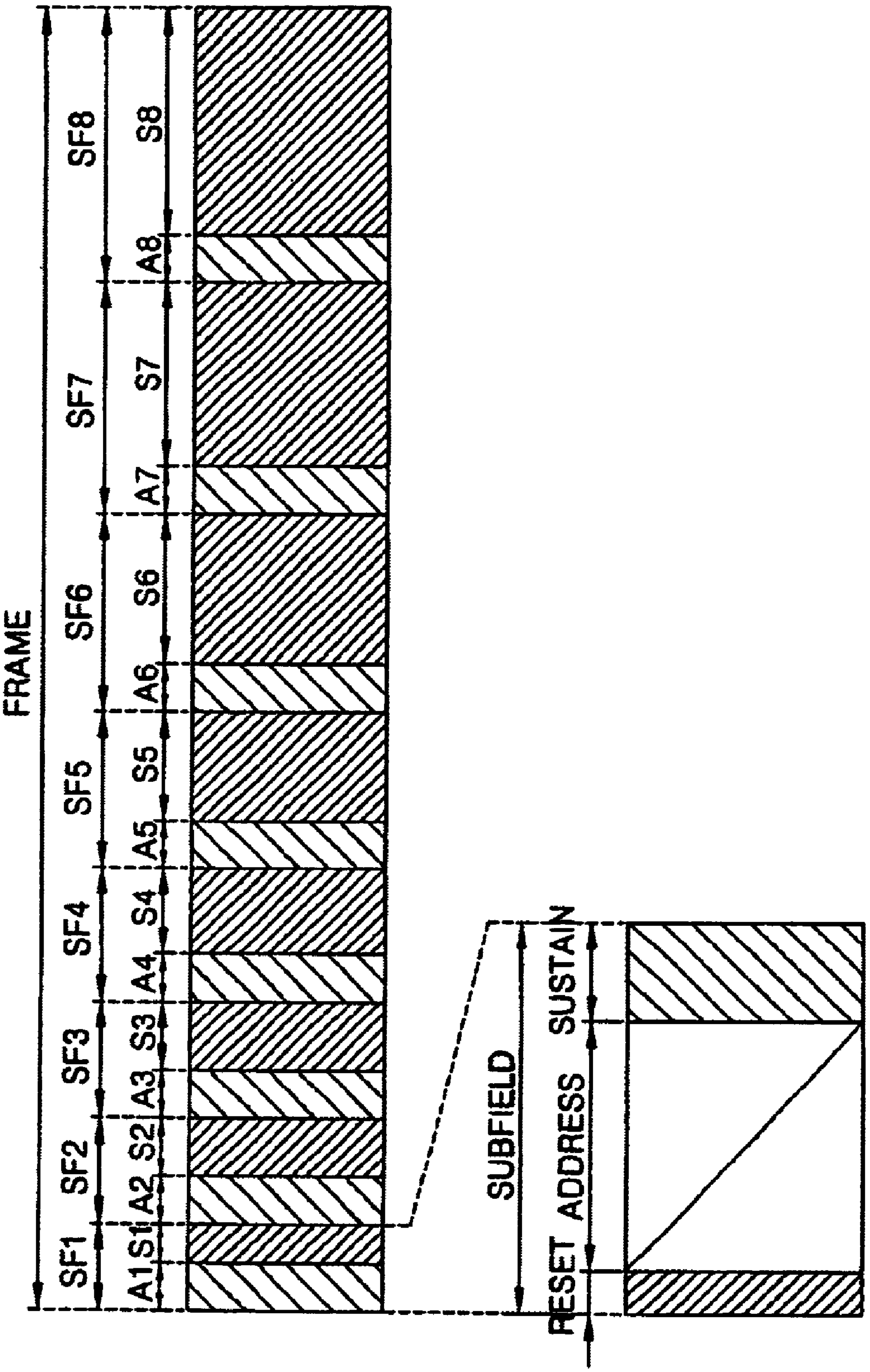
FIG. 3 RELATED ART
FIG. 3 illustrates a view of a general field arrangement.
Figure 4:
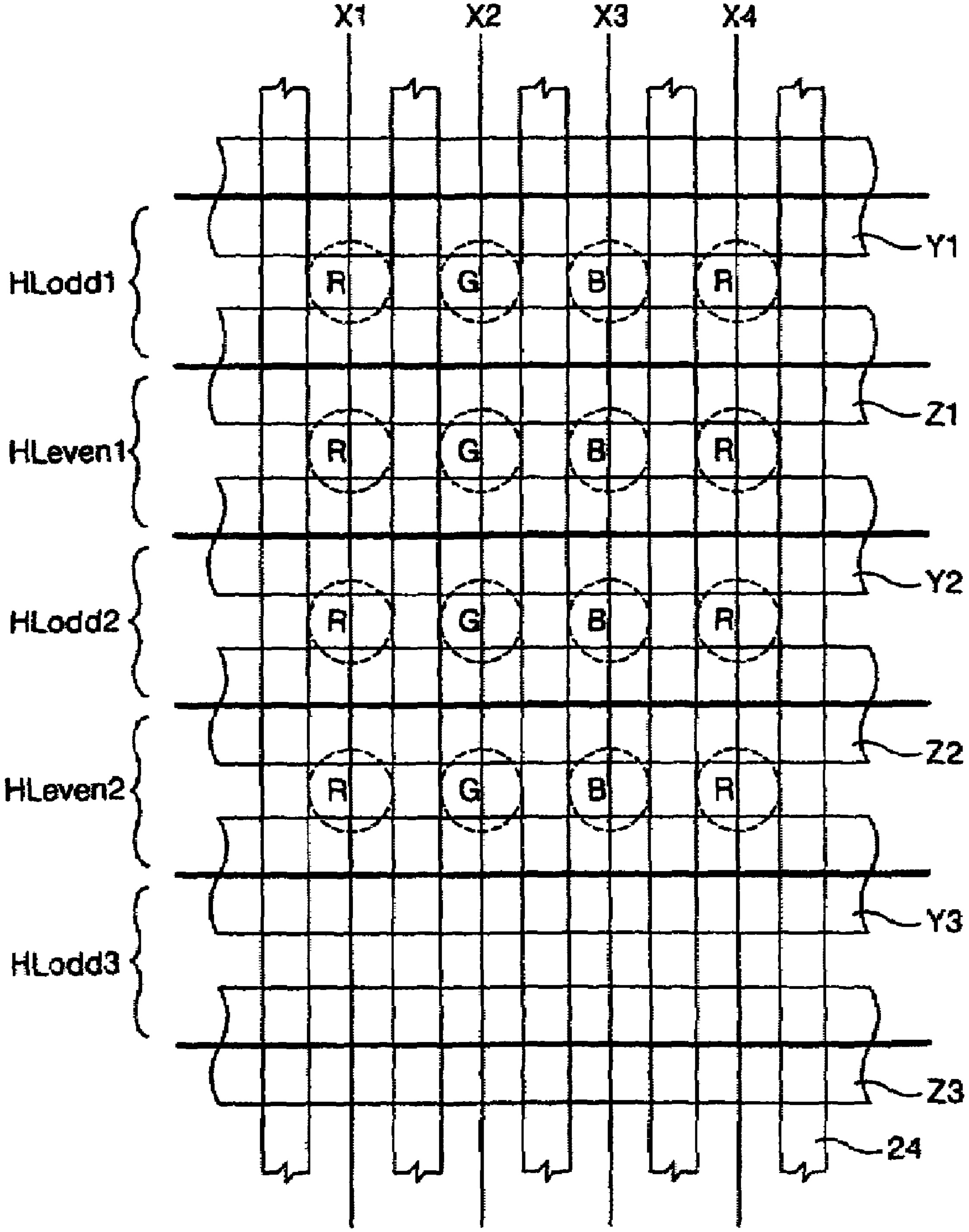
FIG. 4 RELATED ART
FIG. 4 illustrates a plane view of an electrode arrangement of a conventional PDP.
Figure 5:
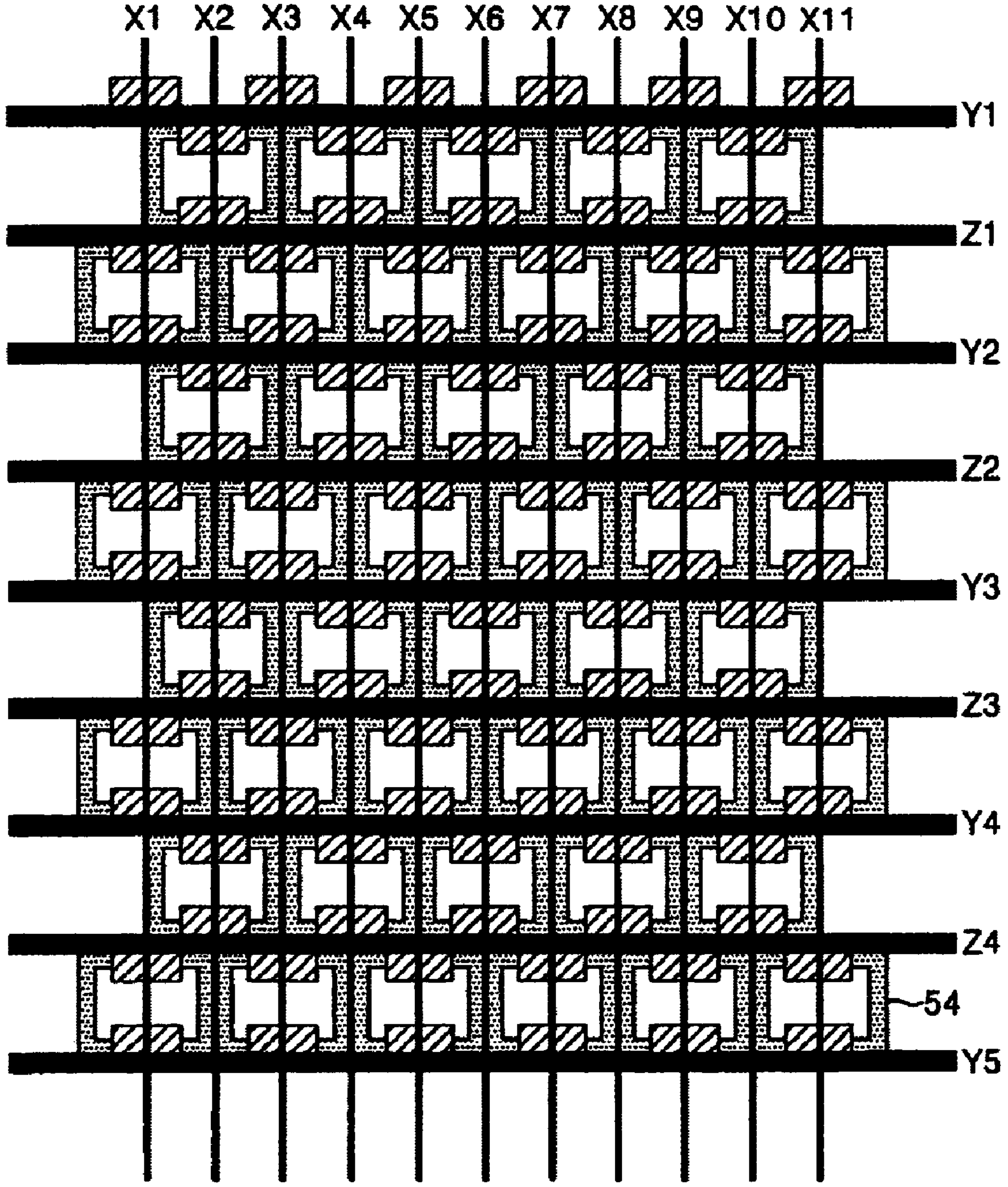
FIG. 5 RELATED ART
FIG. 5 illustrates a plane view of a PDP with a conventional delta type pixel arrangement.
Figure 6:
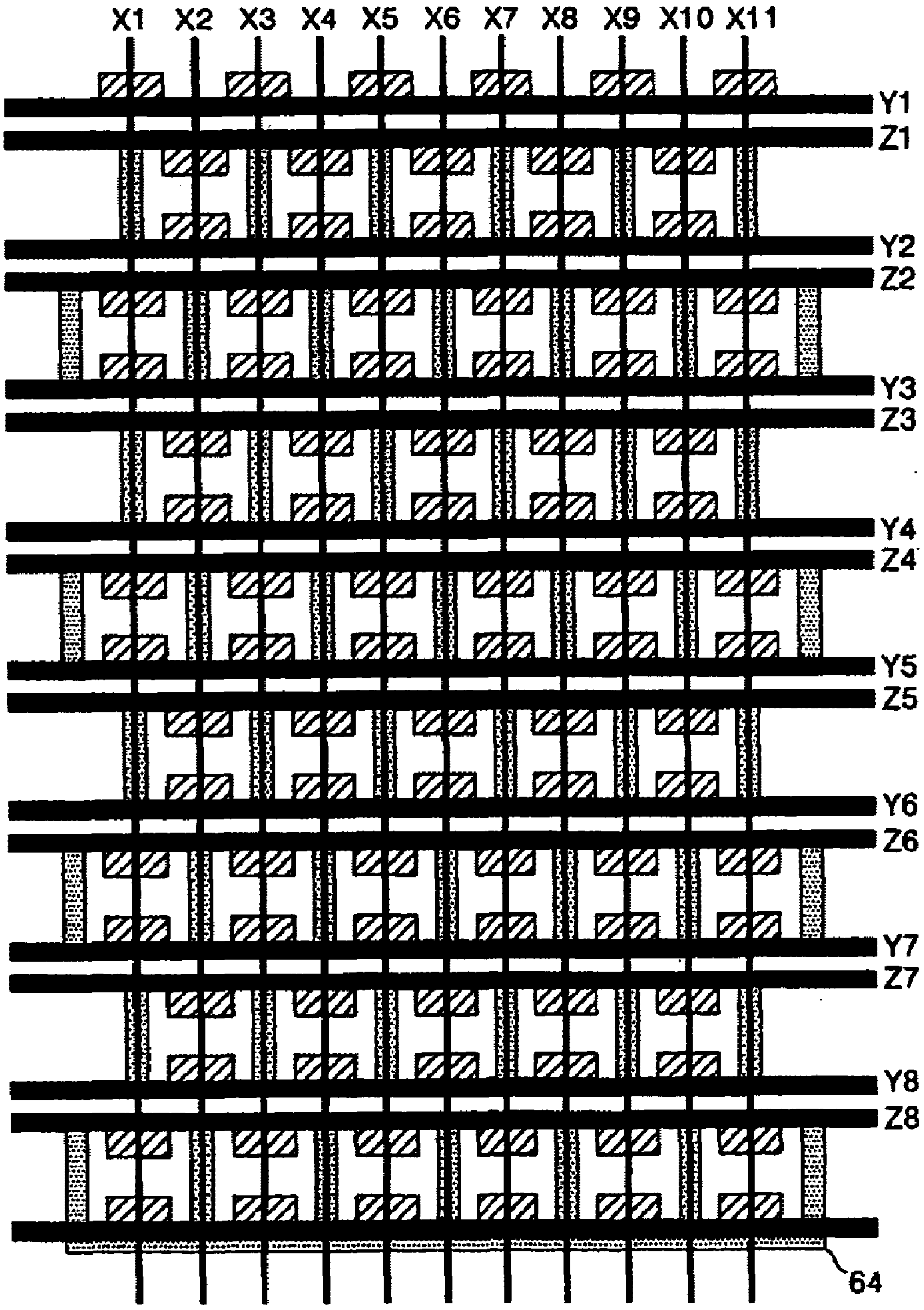
FIG.6 RELATED ART
FIG. 6 illustrates a plane view of a PDP with another conventional delta type pixel arrangement.
Figure 7:
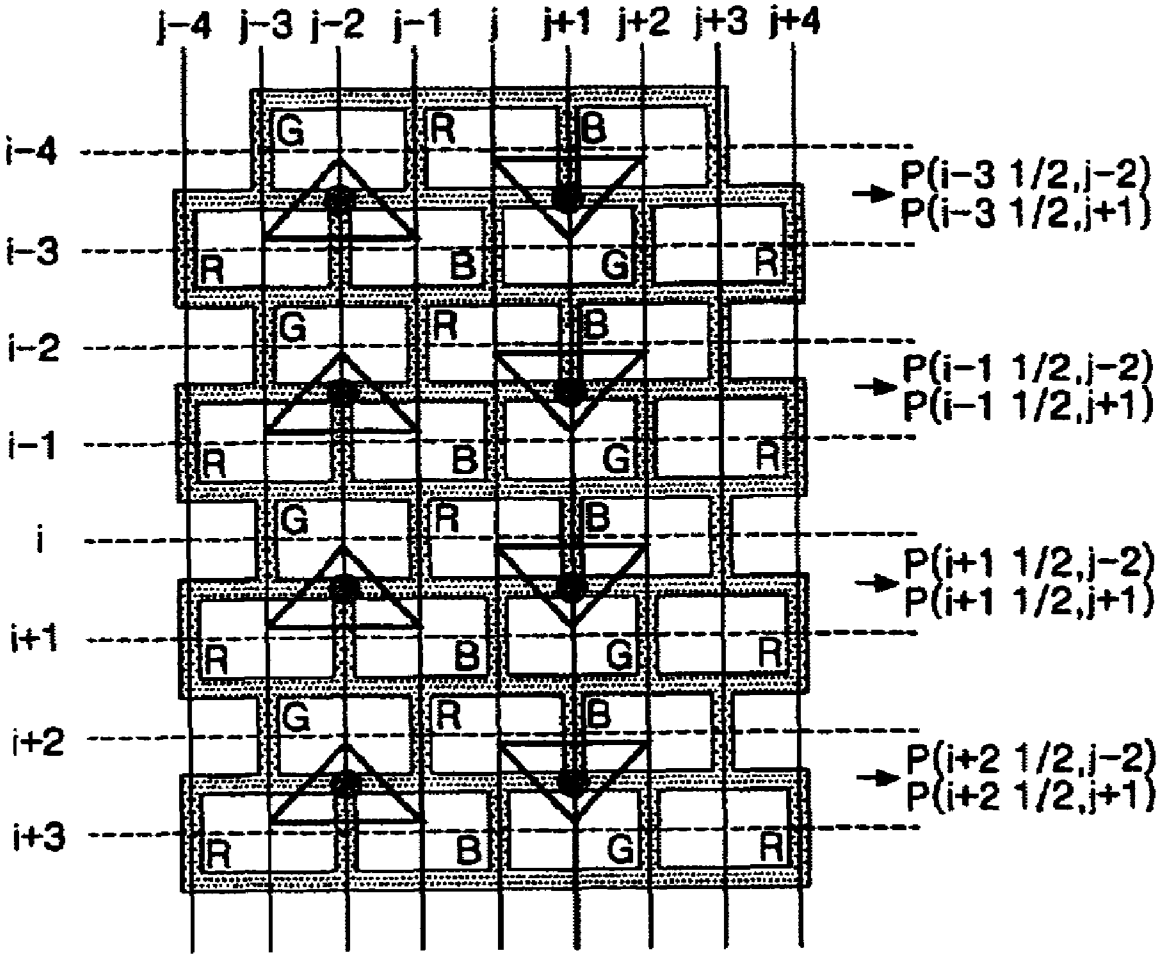
FIG. 7 RELATED ART
FIG. 7 illustrates a plane view of horizontal display lines in a PDP with a conventional delta type pixel arrangement.

In the PDP 80, there are barrier ribs 54 formed in a lattice type. Herein, an extended part is repeated in a vertical direction and a,narrow part in a horizontal direction. Also, the PDP 80 has a ‘Δ’ delta type pixel P1 displaying the first video signal field overlap with an ‘∇’ inverted delta type pixel P2 displaying the second video signal field. The PDP 80 can be replaced with a PDP as in FIG. 6 that has discharge cells arranged in a ‘ ’ delta type and scanning electrodes and sustaining electrodes arranged in each of perpendicularly adjacent discharge cells with a separate structure.

The data aligner 82 does reverse gamma correction and error diffusion by a reverse gamma corrector and an error diffuser etc. (not shown), and then divides data mapped by sub-fields by a sub-field mapping circuit (not shown) into the first video signal field and the second video signal field under the control of the timing controller 81 and realigns them. The more detailed explanation in respect of the first video signal field and the second video signal field is described below in conjunction with FIGS. 9 to 12.

The X driver 83 simultaneously applies the data from the data aligner 82 to the address electrode lines (X(j−4) to X(j+4)) by one horizontal line portion under the control of the timing controller 81.

The Y driver 84 applies a reset signal initializing a full screen, a scanning pulse selecting discharge cell rows (i−4 to i+3) and a sustaining pulse sustaining a discharge of the selected discharge cells to the scanning electrode lines (Y(i−5) to Y(i+3)) under the control of the timing controller 81.

The Z driver 85 applies the sustaining pulse to the sustaining electrode lines (Z(i−4) to Z(i+2)) under the control of the timing controller 81 while operated in turn with the Y driver 84.

The timing controller 81 receives a vertical/horizontal synchronization signal to generate a timing control signal necessary for each of the electrode drivers 81 to 83.

The power supply circuit 86 generates voltages, i.e., a reset signal voltage, a data voltage, a scanning voltage and a sustaining voltage etc., necessary for an electrode driving of the PDP 80.

Figure 9:
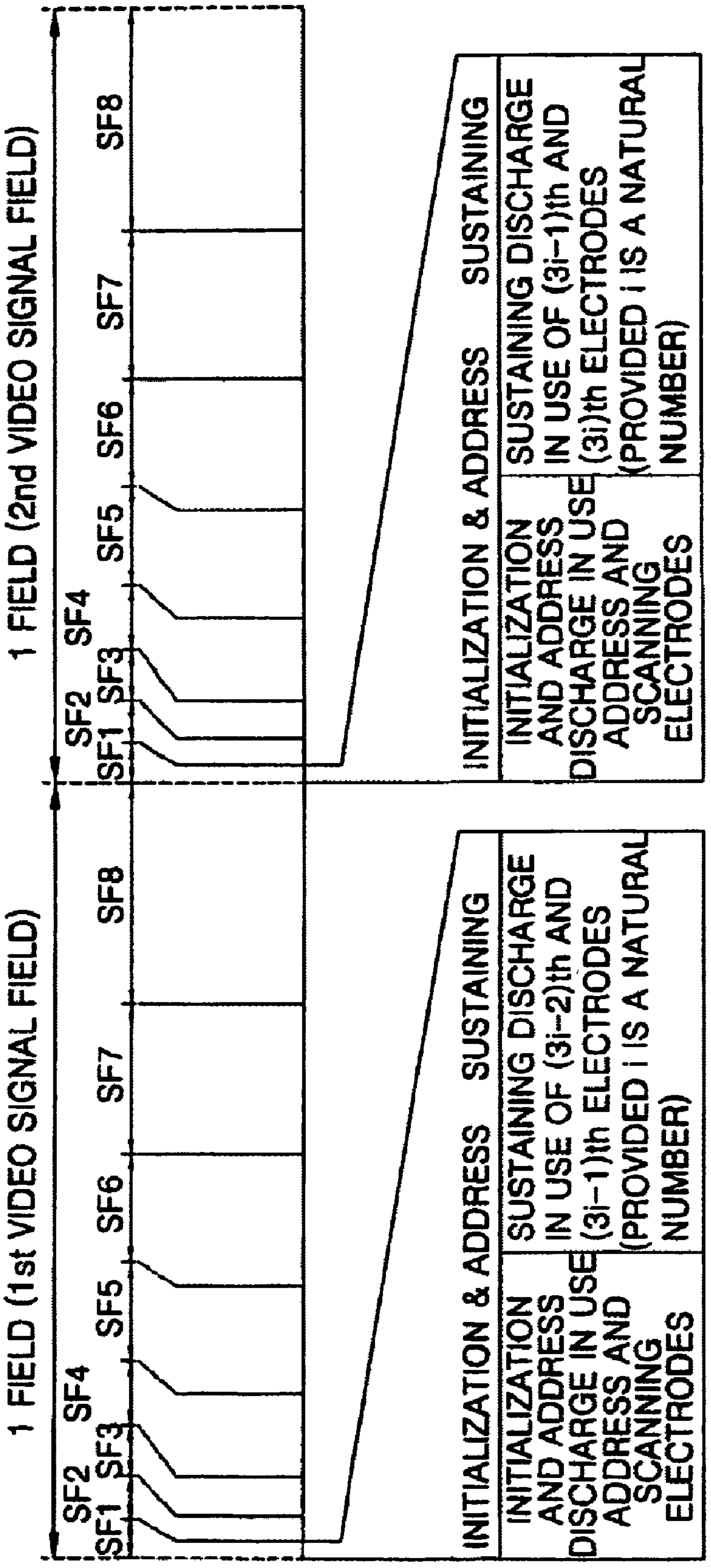
FIG. 9 is a view representing a field arrangement of a video signal of a PDP according to the first embodiment of the present invention.
Figure 10:
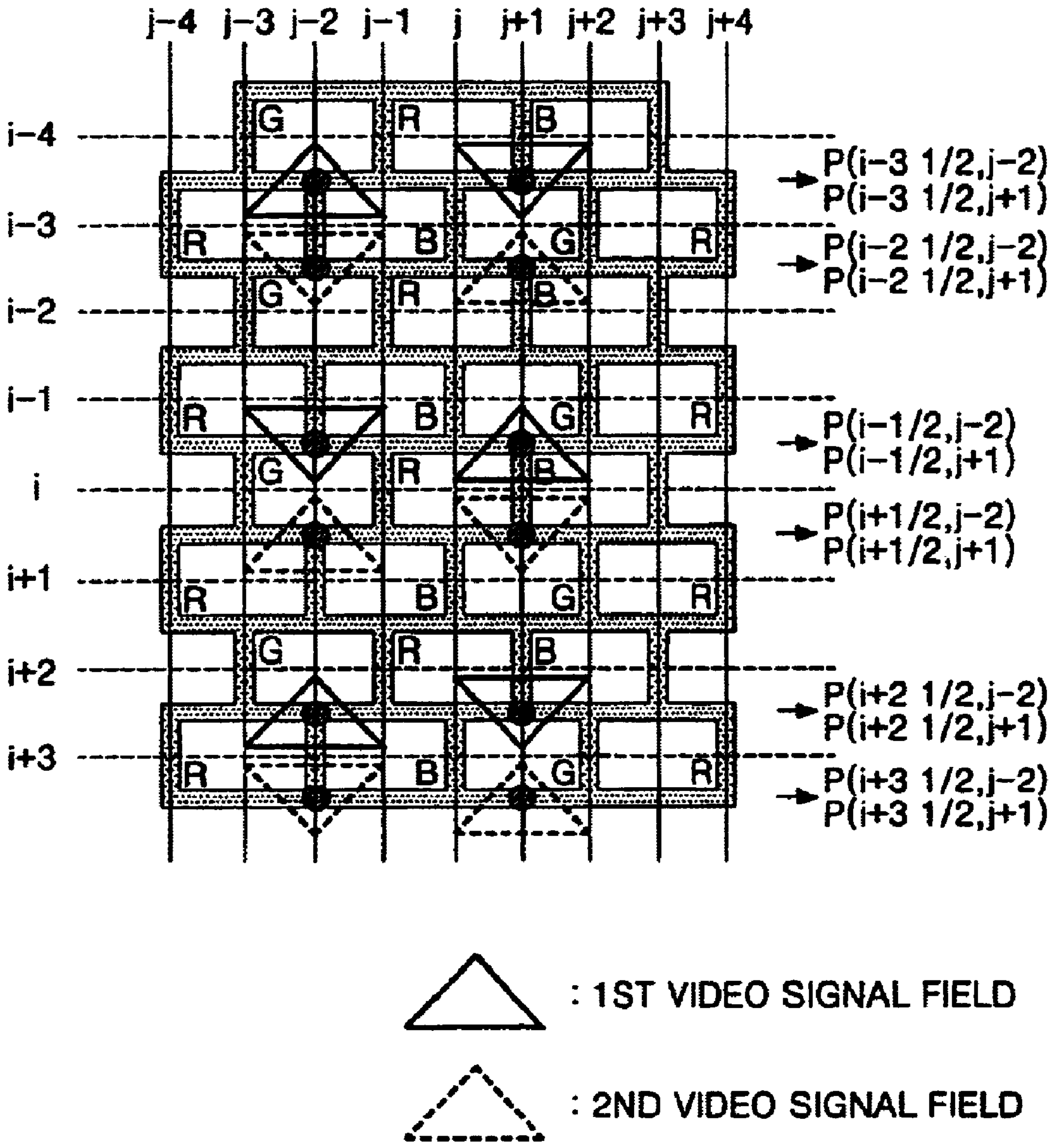
FIG. 10 illustrates a plane view of horizontal display lines and a pixel arrangement when the video signal of FIG. 9 is applied to the PDP of FIG. 8.

FIG. 9 is a view representing a video signal of a PDP according to the first embodiment of the present invention.

Referring to FIG. 9, a driving apparatus of a PDP according to an embodiment of the present invention divide a video signal of one field portion into a plurality of sub-fields SF1 to SF8. And in the driving apparatus, the PDP is driven with the first video signal field displaying discharge cells of the $(3i-2)^{th}$ (i is natural number) and $(3i-1)^{th}$ rows, and the second video signal field displaying discharge cells of the $(3i-1)^{th}$ (i is natural number) and $(3i)^{th}$ rows. The first video signal field and the second video signal field each include a plurality of sub-fields SF1 to SF8 and are alternately arranged.

When displaying the first video signal field, the Y driver 84 selects the discharge cells of the $(3i-2)^{th}$ (i is natural number) and $(3i-1)^{th}$ rows (i−4, i−3, i−1, i, i+2, i+3). By the selected discharge rows (i−4, i−3, i−1, i, i+2, i+3), the first video signal field is displayed in the ‘Δ’ delta or ‘∇’ inverted delta type pixels, shown in solid line in FIG. 10.

When displaying the second video signal field, the Y driver 84 selects the discharge cells of the $(3i-1)^{th}$ (i is natural number) and $(3i)^{th}$ rows (i−3, i−2, i, i+1, i+3, i+4). By the selected discharge rows (i−3, i−2, i, i+1, i+3, i+4), the second video signal field is displayed in the ‘Δ’ delta or ‘∇’ inverted delta type pixels, shown in dotted line in FIG. 10.

Accordingly, the PDP according to the first embodiment of the present invention, assuming that the size and the discharge cell size of this PDP are the same as those of the PDP with the conventional delta type pixel structure, has the horizontal display lines increased 1.5 times as many as or more than the PDP with a conventional delta type pixel structure. Herein, the horizontal display lines is where actual display is carried out.

Figure 11:
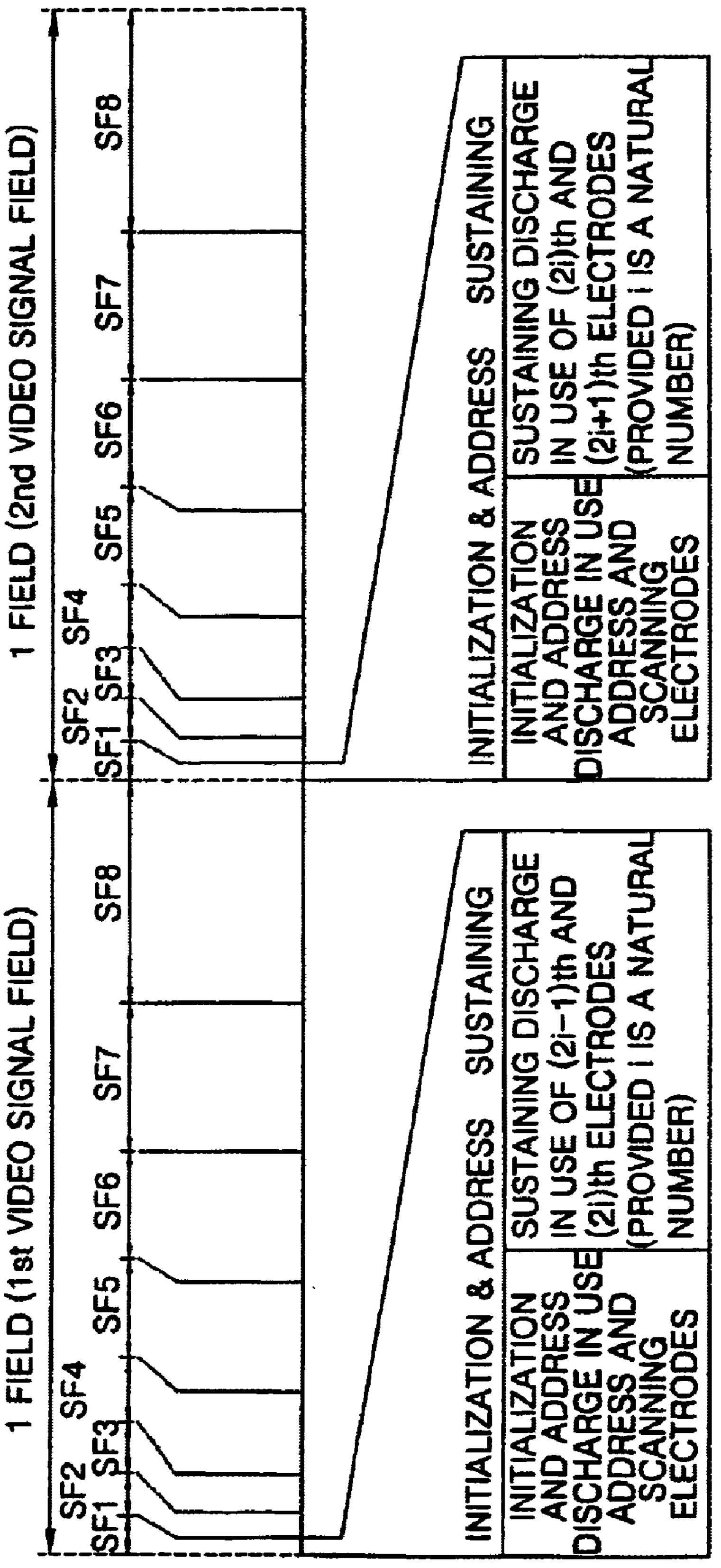
FIG. 11 is a view representing a field arrangement of a video signal of a PDP according to the second embodiment of the present invention.

FIG. 11 is a view representing a video signal of a PDP according to the second embodiment of the present invention.

Referring to FIG. 11, a driving apparatus of a PDP according to an embodiment of the present invention is driven with the first video signal field displaying discharge cells of the $(2i-1)^{th}$ and $(2i)^{th}$ rows, and the second video signal field displaying discharge cells of the $(2i)^{th}$ and $(2i+1)^{th}$ rows. The first video signal field and the second video signal field each include a plurality of sub-fields SF1 to SF8 and are alternately arranged.

Figure 12:
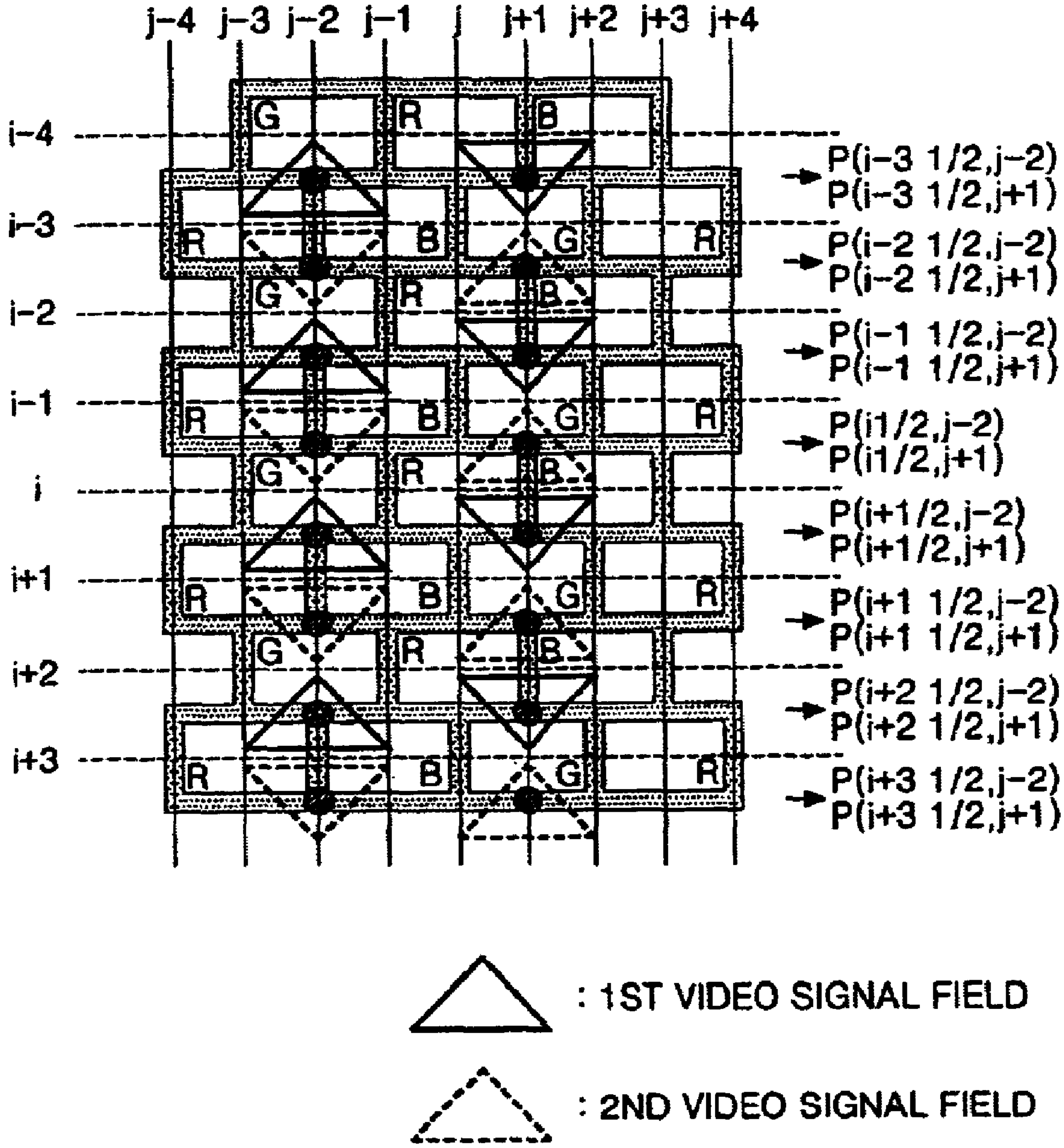
FIG. 12 illustrates a plane view of horizontal display lines and a pixel arrangement when the video signal of FIG. 11 is applied to the PDP of FIG. 8.

When displaying the first video signal field, as in FIG. 12, the Y driver 84 selects the $(2i-1)^{th}$ and $(2i)^{th}$ discharge cell rows (i−4, i−3, i−2, i−1, i, i+1, i+2, i+3). By the selected discharge rows (i−4, i−3, i−2, i−1, i, i+1, i+2, i+3), the first video signal field is displayed in the ‘Δ’ delta or ‘∇’ inverted delta type pixels, shown in solid line in FIG. 12.

When displaying the second video signal field, as in FIG. 12, the Y driver 84 selects the discharge cells of the $(2i)^{th}$ and $(2i+1)^{th}$ rows (i−3, i−2, i−1, i, i+1, i+2, i+3, i+4). By the selected discharge rows (i−3, i−2, i−1, i, i+1, i+2, i+3, i+4), the second video signal field is displayed in the ‘Δ’ delta or ‘∇’ inverted delta type pixels, shown in dotted line in FIG. 12.

Accordingly, the PDP according to the second embodiment of the present invention, assuming that the size and the discharge cell size of this PDP are the same as those of the PDP with the conventional delta type pixel structure, has the horizontal display lines increased 2 times as many as or more than the PDP with a conventional delta type pixel structure. Herein, the horizontal display lines is where actual display is carried out.

On the other hand, the driving method of the PDP according to the embodiment of the present invention selects discharge cells in accordance with the first video signal and/or the second video signal while moving upward or downward by one low at a time, so that it is possible to ease a phenomenon that discharges are concentrated a specific discharge cell.

As described above, in the method and the apparatus for the PDP according to the present invention, it is possible to realize a high resolution and increase the resolution without reducing the size of the discharge cell since the horizontal display lines are increased in the same condition as the PDP with the conventional delta type pixel structure, so that a picture can be displayed with high brightness.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of driving a plasma display panel, comprising:

dividing a video signal into a first video signal field and a second video signal field;

applying the first video signal field to the plasma display panel, wherein the first video signal field is applied such that only discharge cells in row numbers that satisfy the expression (3i-2) or (3i-1) are displayed; and applying the second video signal field to the plasma display panel, wherein the second video signal field is applied such that only discharge cells in row numbers that satisfy the expression (3i-1) or (3i) are displayed;

wherein i is a natural number.

2. A method of driving a plasma display panel, comprising:

dividing a video signal into a first video signal field and a second video signal field;

applying the first video signal field to the plasma display panel, wherein the first video signal field is applied such that only discharge cells in row numbers that satisfy the expression (2i-1) or (2i) are displayed; and applying the second video signal field to the plasma display panel, wherein the second video signal field is applied such that only discharge cells in row numbers that satisfy the expression (2i) or (2i+1) are displayed;

wherein i is a natural number.

3. A method of driving a plasma display panel with pixel cells that each comprise first, second and third sub-pixel cells, comprising:

dividing a video signal into a first video signal field and a second video signal field;

displaying a first pixel cell with the first video signal field; and displaying a second pixel cell; with the second video signal field;

wherein the first pixel cell displayed with the first video signal field and the second pixel cell displayed with the second video signal field share at least one common sub-pixel.

4. The method according to claim 3, wherein the sub-pixel cells of the first pixel cell are arranged in any one of a delta configuration and an inverted delta configuration.

5. The method according to claim 3, wherein the sub-pixel cells of the second pixel cell are arranged in any one of a delta configuration and an inverted delta configuration.

6. The method according to claim 3, wherein two of the sub-pixel cells of the first pixel cell are shared by the second pixel cell.

7. The method according to claim 3, wherein the first and second pixel cells overlap each other and are displayed at different times.

8. The method according to claim 3, wherein the first, second and third sub-pixels comprise red, green and blue sub-pixels, respectively.

9. A driving apparatus for a plasma display panel with pixel cells that each comprise first, second and third sub-pixel cells, comprising:

a data aligner that divides a video signal into a first video signal field and a second video signal field;

a first driver that displays a first pixel cell using the first video signal field; and a second driver that displays a second pixel cell using the second video signal field, wherein the first pixel cell displayed using the first video signal field and the second pixel displayed using the second video signal field share at least one common sub-pixel.

10. The driving apparatus according to claim 9, wherein the sub-pixel cells of the first pixel cell are arranged in any one of a delta configuration and an inverted delta configuration.

11. The driving apparatus according to claim 9, wherein the sub-pixel cells of the second pixel cell are arranged in any one of a delta pattern and an inverted delta pattern.

12. The driving apparatus according to claim 9, wherein the plasma display panel includes:

lattice type barrier ribs for dividing the sub-pixel cells;

an address electrode alternately arranged in the barrier ribs and the sub-pixel cells in a vertical direction in a cycle of one discharge cell;

a scanning electrode intersecting the address electrode; and a sustaining electrode intersecting the address electrode.

13. The driving apparatus according to claim 12, wherein the scanning electrode and the sustaining electrode are shared by perpendicularly adjacent sub-pixel cells.

14. The driving apparatus according to claim 12, wherein the scanning electrode and the sustaining electrode are independently arranged in each of perpendicularly adjacent sub-pixel cells.

15. The driving apparatus according to claim 12, wherein the first driver includes:

a data driver for applying data of the first video signal field to the address electrode; and a scanning/sustaining driver for selecting a sub-pixel cell row of the first pixel cell and sustaining a discharge in each of the selected sub-pixel cells.

16. The driving apparatus according to claim 12, wherein the second driver includes:

a data driver for applying data of the second video signal field to the address electrode; and a scanning/sustaining driver for selecting a sub-pixel cell row of the second pixel cell and sustaining a discharge in each of the selected sub-pixel cells.

17. The driving apparatus according to claim 9, wherein the first, second and third sub-pixels comprise red, green and blue sub-pixels, respectively.

18. A plasma display, comprising:

a plurality of pixel cells each comprising at least three sub-pixel cells in a delta or inverted delta configuration, wherein the sub-pixel cells are arranged in a plurality of rows;

wherein at least one sub-pixel cell between two rows of sub-pixel cells is shared by two different pixel cells.

19. The plasma display of claim 18, wherein the three sub-pixel cells of each pixel cell comprise red, green and blue sub-pixel cells.

20. The plasma display of claim 18, wherein the two different pixel cells that share the at least on sub-pixel cell are displayed at different times.

* * * * *